United States Patent Office 2,800,285
Patented July 23, 1957

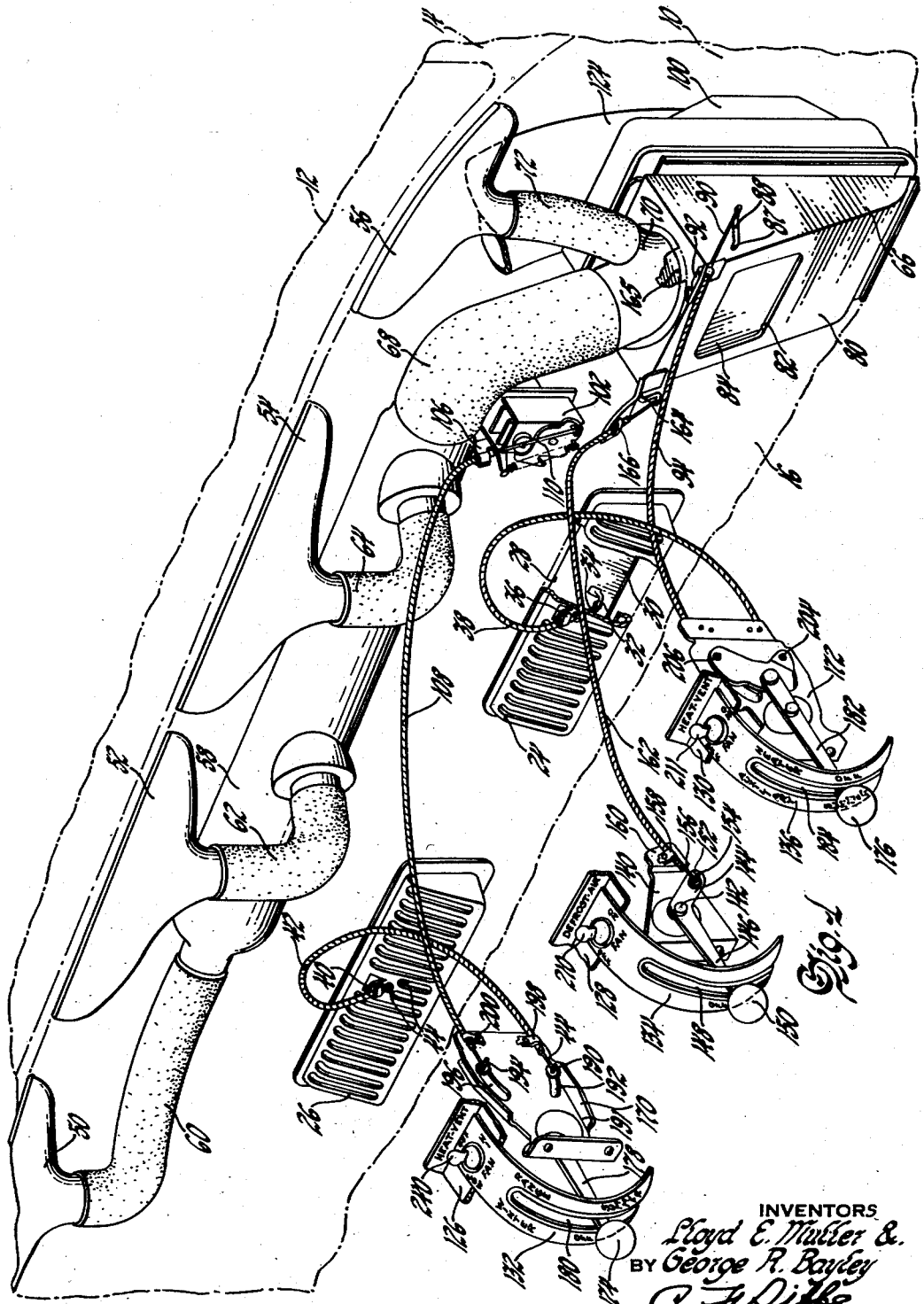

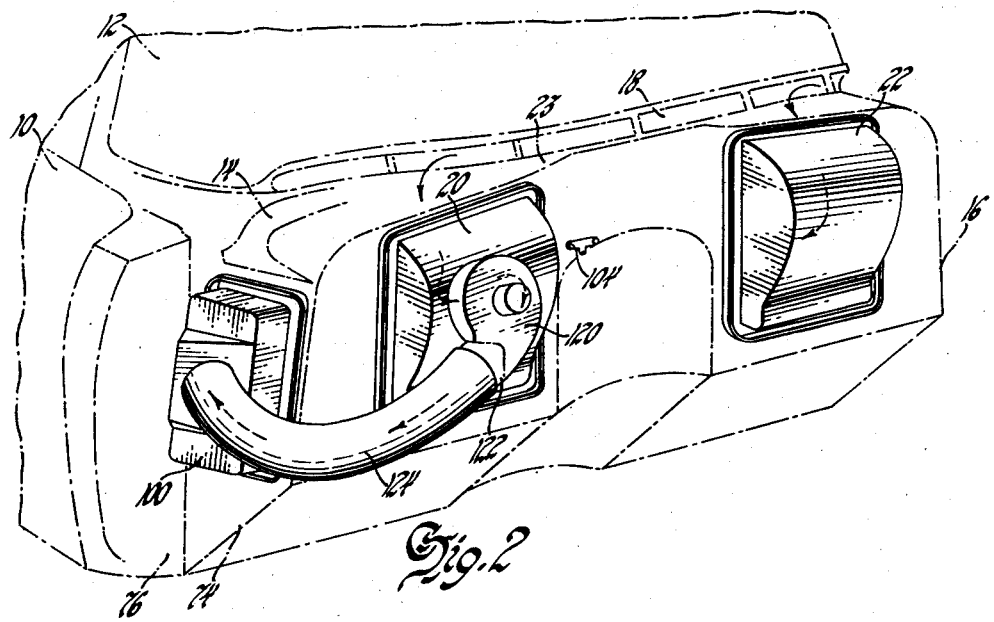
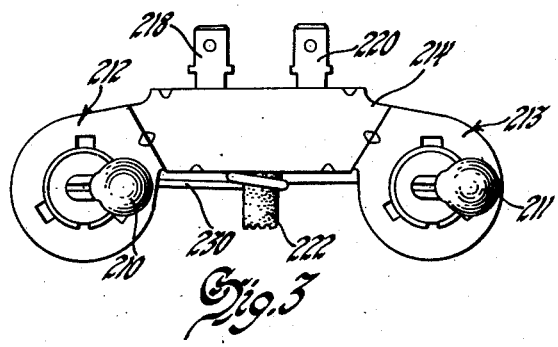
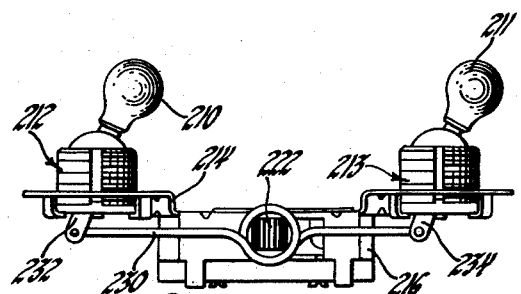

2,800,285

HEATING, VENTILATING, AND DEFROSTING SYSTEMS

Lloyd E. Muller and George R. Bayley, Flint, Mich., assignors to General Motors Corporation, Detroit, Mich., a corporation of Delaware Application December 1, 1953, Serial No. 395,485

7 Claims. (Cl. 237—28)

This invention relates to heating, ventilating and defrosting systems and more particularly to such systems when built as integral parts of vehicle body structures.

It has been found advantageous, in promoting bodily comfort for users of modern automotive vehicles, to increase greatly the volume and velocity of air admitted to the passenger compartments. Such increase is necessarily accompanied by a proportionately greater amount of moisture entrained in the air. Baffles which are the cause of eddy currents cannot be used effectively to remove the objectionable moisture before the air is admitted to the passenger compartments. A solution to this problem has been provided by a ventilation system shown and claimed in an application for United States Letters Patent Serial Number 392,806, filed November 18, 1953, in the names of James D. Leslie, Robert M. Fox, and Lloyd E. Muller, and entitled "Vehicle Heater With Built-In Ventilation System," and to which reference may be made.

Additional problems have been encountered, however, in providing a system of the type disclosed in the patent application with heating and defrosting mechanisms combined with convenient controls for those mechanisms as well as for the ventilation aspects. It is to a solution of these added problems that the present invention is directed.

An object of the present invention is to provide an improved heating, ventilating and defrosting system in a vehicle, the system being compactly arranged in integral association with the fire wall of the vehicle.

Another object of the invention is to provide an improved arrangement of controls extending to the instrument panel of a vehicle for convenience of the operator, and the arrangement being such as to simplify operation of a heating, ventilating and defrosting system.

A feature of the invention is a system including duct means passing through the fire wall of a vehicle in combination with a heater, a fan, defroster nozzles, and system controls mounted on the instrument panel of the vehicle.

These and other important features of the invention will now be desribed in detail and then pointed out more particularly in the appended claims.

In the drawings:

Fig. 1 is a perspective view of an arrangement of defroster nozzles, ventilation vents, heater, and system controls, this view being from the interior of a vehicle looking in the direction of the fire wall with the instrument panel of the vehicle being broken away;

Fig. 2 is a perspective view of a portion of a vehicle body looking from the engine side of the vehicle fire wall with important parts of the structure in which the present invention is embodied being shown in full lines;

Fig. 3 is an enlarged plan view of a switch element, parts of which being shown in Fig. 1;

Fig. 4 is a side elevational view of the switch element shown in Fig. 3;

Figure 5:
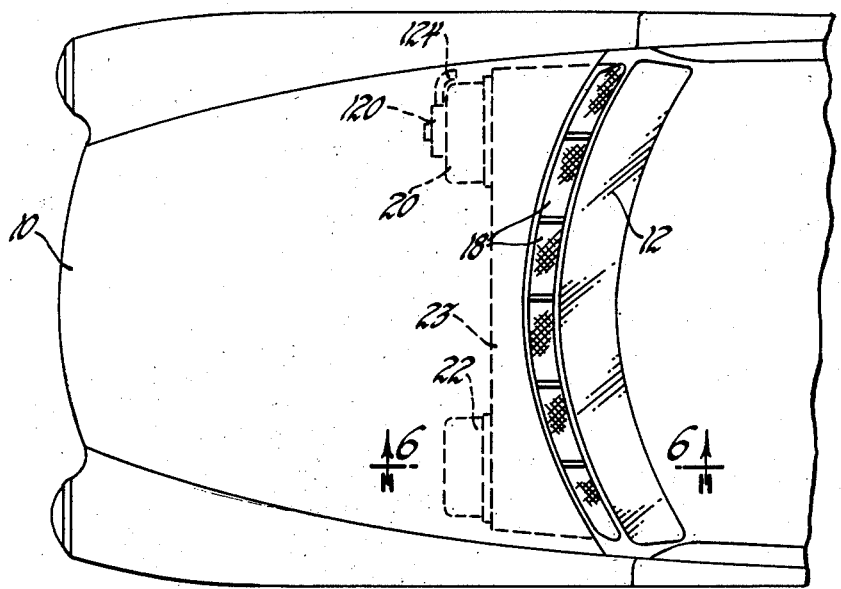
Fig. 5 is a plan view of the front end of a vehicle in which a system embodying the present invention is installed.
Figure 6:
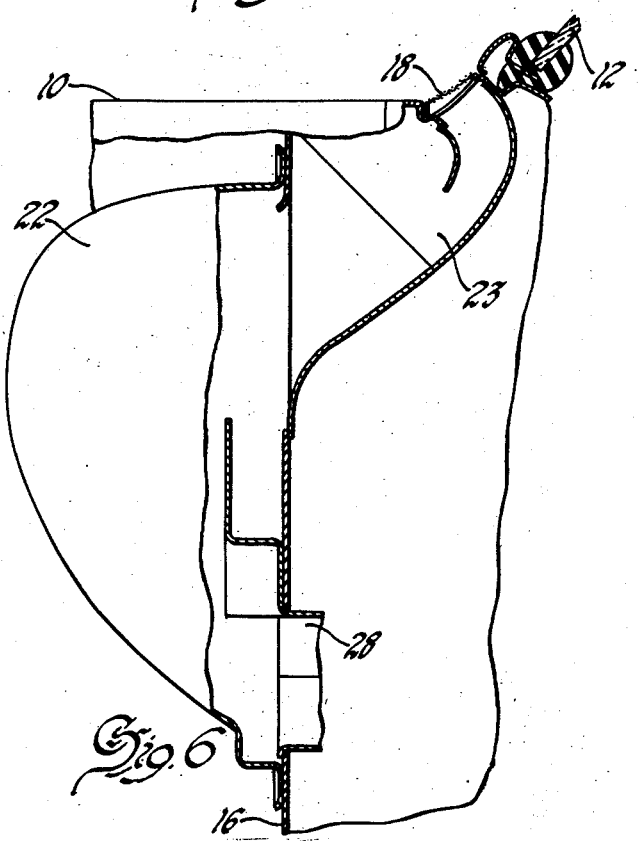
Fig. 6 is an elevational view with parts in section showing some of the structure illustrated in Fig. 2.

A heating, ventilating and defrosting system embodying the present invention is illustrated in the drawings as installed in a vehicle 10 having a windshield 12, a cowl 14 and a fire wall 16 separating the engine compartment from the passenger compartment. The cowl 14 is provided with an air inlet 18 which forms a scoop of narrow height or slot-like configuration. The air inlet 18 is of sufficient width to extend substantially the width of the cowl 14 and is arranged to supply fresh or outside air to a duct system including two downwardly extending duct members 20 and 22 which are interconnected by a transverse communicating duct 23.

The patent application previously referred to discloses the full duct structure or system for receiving outside air from the inlet 18 and for discharging that air without objectionable moisture into the passenger compartment. In the present instance a broadly similar arrangement obtains in that the duct members or blisters 20 and 22 of such a system or first duct means as herein defined are mounted on the engine side of the fire wall 16 and have air outlets near the lower ends thereof extending through openings in the fire wall 16 which terminate in grill structures 24 and 26, respectively, disposed at the passenger compartment side of the fire wall. The openings in the fire wall 16 leading to the grill structures are similar in size and shape, one of which being shown in Fig. 1 at 28.

The grill structures 24 and 26 are identical in construction and air flow therethrough is controlled by suitable valves. As seen in Fig. 1, the opening 28 in the fire wall 16 is adapted to be closed by an adjustable butterfly valve 30 which is pivoted to the fire wall 16 in a conventional manner for actuation between a fully opened and a fully closed position. The pivots are not shown in the drawings but are located along the horizontal center line of the valve 30. The valve member 30 is provided below its horizontal pivotal axis with a hook member 32 to which a Bowden wire 34 is pivotally affixed. Clamping means 36 are mounted on the grill structure 24 to support a conduit or sheath 38 in which the wire 34 is guided.

As previously stated, the grill structure 26 is similar to the structure 24 and in this case a clamping element 40 is utilized to support one end of a conduit 42 which guides a Bowden wire 44 for operating a valve not disclosed in the drawings but similar to the valve 30 in structure and mounting.

On the passenger compartment side of the windshield 12 and adjacent the base of the latter are mounted four defroster nozzles 50, 52, 54 and 56. Three of these nozzles are so arranged as to direct air received from a manifold 58 beneath the instrument panel of the vehicle towards the under side of the windshield 12. The left end nozzle 50 is connected to the manifold 58 by a flexible hose 60. The nozzles 52 and 54 are connected to the side of the manifold 58 by two flexible hose connections 62 and 64, respectively. The connecting conduits for the defroster nozzles are considered herein as a second duct means. One end of the manifold 58 communicates with a heated air distribution chamber 66 by means of a flexible hose 68 and one portion of a special Y-fitting 70. The fourth or right-hand end nozzle 56 also communicates with the chamber 66 but by a short length of hose 72 and another portion of the fitting 70. The special Y-fitting 70 is attached to the top of the distribution chamber 66.

As clearly seen in Fig. 1, the distribution chamber 66 is wedge-shaped and is flanged at four sides for attachment to the passenger compartment side of the wall portion 74 (Fig. 2) adjoining the fire wall 16 adjacent the right-hand portion 76 of the vehicle body. The chamber 66 is provided with one wall 80 facing the passenger compartment and inclined downwardly and towards the outside of the vehicle. This wall 80 has an aperture 82 through which the flow of air is controlled by a valve member 84. This valve member 84 is mounted to pivot on a horizontal shaft 87 which is journaled in the side walls of chamber 66 and at a short distance below the top thereof. Shaft 87 extends through one side wall and the end has formed thereon a crank 88 to which is pivotally attached one end of a Bowden wire 90. Clamping means 92 is mounted on the top of the chamber 66 to hold a conduit 94 for guiding the wire 90.

The heater 100 is mounted on the engine side of the wall 74 and is of conventional construction and includes a core not shown and through which hot water may be circulated. The heater is herein designated as an auxiliary heater and this is its preferred status but it may be employed as the sole or main heater. The air discharge side of the heater 100 is in communication with the distribution chamber 66 through an opening not shown formed in the wall 74. It will be understood that hot water is circulated through the core of the heater 100 in the conventional manner and by hose connections not shown. These connections lead through a temperature control valve 102 (Fig. 1) mounted on the fire wall 16 with a portion 104 (Fig. 2) extending through the fire wall. It will be understood that circulation of hot water through the heater core is by way of the connection 104 so that the temperature regulating valve 102 is adapted to control the temperature of the heater. A clamp 106 is attached to the valve 102 for holding one end of a conduit 108 which guides a Bowden wire 110 (Fig. 1) by means of which the valve may be adjusted in order to regulate the quantity of water flowing through the heater 100. These valves are of conventional construction and the same or others of equivalent nature may be purchased on the market which are capable of achieving the ultimate function of adjusting the temperature of air admitted.

A fan 120 is mounted in the engine compartment with its inlet in communication with the right-hand duct member 20 and its air discharge outlet 122 in communication with the heater 100 by means of a flexible hose or conduit 124.

Only fragmentary portions 126, 128 and 130 of an instrument panel are shown in Fig. 1; but on this panel are mounted three arcuate and slotted guide members 132, 134 and 136. These members lie in parallel and spaced positions within convenient reach of an operator in the passenger compartment.

Concealed by the instrument panel and immediately forward of the arcuate member 134 is mounted a bracket 140 which is attached to the instrument panel by means not shown. The bracket 140 bears a pivot pin 142 upon which is journaled a bell crank 144. A rearwardly extending arm 146 of the bell crank is arranged to swing vertically within the slot 148 of the member 134 and carries a knob 150 at the end thereof. The other end 152 of the bell crank is provided with a pin 154 to which is pivotally attached the end of a Bowden wire 156. A clamp 158 is attached to a forwardly extending portion 160 of the bracket 140 to hold one end of a conduit 162. The wire 156 is guided by the conduit 162 and the opposite end thereof is pivotally joined to a crank 164 for operating a valve 165 within the chamber 66 for controlling an opening leading from the top horizontal wall of that chamber through the Y-connection 70 to the defroster nozzles. The valve 165 is arranged to swing on an axis above the shaft 87 of valve 84. A bracket 166 is attached to the top of the chamber 66 for holding the conduit 162 in position.

Concealed by the arcuate members 132 and 136 are two lever assemblies or control units 170 and 172. These assemblies are attached to the instrument panel by means not shown and are adapted to be operated by two knobs 174 and 176 respectively. The assembly 170 is provided with a lever 178 to which the knob 174 is affixed and this lever extends through the arcuate slot 180 of the member 132. The assembly 172 is provided with a lever 182 having the knob 176 attached thereto and extends through the slot 184 of the member 136. The two assemblies 170 and 172 are identical in construction and may be installed with the operating lever to the left or to the right without affecting the operation. In Fig. 1, the lever 178 is shown placed to the left and the lever 182 is shown arranged to the right. It will be understood that each assembly 170 or 172 constitutes a single means whereby either of two motions may be imparted to control mechanisms independently of the other or one mechanism may be placed in selected adjustment while another mechanism is retained or returned to a normal condition. For more specific details regarding the construction of control units or assemblies such as the units 170 and 172, attention is directed to the application for United States Letters Patent Serial Number 391,425, filed November 12, 1953, in the name of George R. Bayley and entitled "Control Mechanism." It is sufficient herein to state that in such a control unit, an upward movement of a hand knob from a mid-point position will pull an upper wire attached to the unit towards the operator without moving a similar but lower control wire except for returning it to a normal position if previously displaced therefrom. Also, a downward movement of the hand knob from a mid-point position causes the lower wire to be pulled toward the operator and brings the upper wire to a normal position if previously displaced therefrom.

With regard to the assembly 170, a fixed plate or bracket 191 is attached by means not shown to the vehicle structure and in concealment behind the instrument panel. One end of the Bowden wire 44 is pivotally connected to a pin 190 which may be swung in an arc and along a slot 192 formed in the bracket 191. Another pin 194 may be moved in a second slot 196 provided in the bracket 191 and to this pin is pivoted one end of the wire 110. Clamps 198 and 200 are mounted on the bracket 191 to hold the ends of the conduits or sheathes 42 and 108, respectively, in proper positions. A downward movement of the knob 174 will cause the pin 194 to remain in or to return to its position at the end of the slot 196 and the pin 190 will then swing rearwardly with the pin 194 as a center. An upward movement of the knob 174 will similarly result in an arcuate and rearward movement of the pin 194 about the pin 190 as a center after the pin 190 reaches its position as shown in Fig. 1.

With regard to the assembly 172, pins 204 and 206 are utilized to operate Bowden wires 34 and 90, respectively.

At the upper end of the arcuate members 134 and 136 are mounted, respectively, knobs 210 and 211 which are retained on ball and socket pivot assemblies 212 and 213. These assemblies are supported by means of a base plate 214 which is joined to an electric switch 216 having two terminals 218 and 220. The switch 216 is operated by a conventional finger piece 222 for making or breaking a circuit through the switch by means of which the auxiliary heater fan 120 may be controlled. The arrangement of each knob 210 or 211 is such that motion of either will be transmitted to the finger piece 222 by means of a stiff wire member 230. The member 230 is looped around the finger piece 222 to move therewith and the ends of the member 230 are pivoted to the ends of levers 232 and 234 which are arranged to be actuated by motion of the levers 210 and 211.

A second switch is provided beneath the top of the arcuate member 132 and a control knob 240 is arranged to actuate it. The second switch is for controlling an electric circuit for operating an underseat heater fan which is not disclosed in the drawings. It will be appreciated that such a fan may be employed for recirculating air within the passenger compartment.

The operation of the system by means of the controls provided is apparent from the above description, but by way of added explanation it may be stated that during normal and cold weather operation, it is desirable to shut off air circulation through the grills 24 and 26 and to admit heated air through the opening 82 from the auxiliary heater 100. To bring this about the operator imparts an upward movement to the knob 174, if not already positioned for winter driving, and also to the knob 176. This produces a pull towards the operator of the upper wire 110 and 90, respectively, to regulate the valve 102 and to open the valve 84. The lower wire 44 or 34 will simultaneously remain in or return to a normal position, i. e. with the valves behind the grills 26 and 24 closed.

Ordinarily, during cold weather and when a defrosting effect for the windshield 12 is not needed, the defroster control knob 150 is retained in its normal or "off" position thereby holding the defroster valve 165 in its horizontal or closed position. Assuming, however, that the windshield 12 is to be defrosted, knob 150 may be raised or swung upwardly thereby to open the defroster valve 165 by swinging the latter downwardly about its axis. Action of the fan 120 is then effective to force heated air upwardly from the distribution chamber 66, through the defroster nozzles 52, 54 and 56, for impingement against the windshield 12. It may be seen that the defroster valve 165 and the valve 84 may each be opened at the same time so that part of the air from the fan 120 and the heater 100 is utilized for defrosting and part is guided directly into the passenger compartment through the opening 82.

It is also to be understood that during warm weather, a downward movement of knobs 174 and 176 from their midway positions will cause a rearward pull on the lower wires 44 and 34 to open the valves behind the grill 26 and 24, respectively. During this range of downward knob movement, the upper wires 110 and 90 remain in their normal positions, i. e. with the valve 102 adjusted for no heat and the valve 84 closed.

The left-hand instrument panel unit 170 has mounted near the upper end of arcuate member 132 a switch (not shown) with its operating lever 240 for controlling the under-seat heater fan as heretofore referred to. It also contains provisions for regulating the water and air temperature for the heater 100 which may be set for a season of year and need be used only occasionally as extreme variations in weather require.

The intermediate instrument panel unit with the knob 150 contains all controls necessary during the limited periods in the cold weather seasons for defrosting the windshield. This assembly also forms a convenient grouping. The temperature control is not included within this intermediate control arrangement as the left-hand control unit will ordinarily be set properly and remain so during most cold weather conditions to satisfy the demands for defrosting.

The right-hand instrument panel unit with the knob 176 is another grouping and constitutes an auxiliary control. It serves selectively to admit cool or outside air through the right-hand grill 24 or heated air through the opening 82 leading from the auxiliary heater 100.

Because of the mechanically interconnected dual controls 210 and 212 of the defroster and auxiliary heater fan switch 216, the use of a single fan 120 is permitted to supply forced air for the various indicated functions of heating, ventilating and/or defrosting and still have the switch associated with the chosen function at the instrument panel. This eliminates complicated or confusing instructions which would be necessary if each of the two levers or hand knobs 210 and 212 were associated with a separate switch.

We claim:

1. A heating, ventilating and defrosting system installed in the body of an automotive vehicle having a passenger compartment, a windshield, a cowl, a fire wall and an instrument panel, said system comprising first duct means with an inlet in said cowl near the base of the said windshield and extending from said inlet and forwardly through said fire wall, a fan with its inlet connected to said first duct means, a heater with an air outlet, means connecting the outlet of said fan with said heater, a distribution chamber beneath said instrument panel and in communication with said heater air outlet, a second duct means connected to said distribution chamber, defroster nozzles adjacent to and directed at said windshield and connected to said second duct means, an opening in said distribution chamber in communication with said passenger compartment, a valve arranged to control air flow through said opening, and means extending to said instrument panel for controlling said valve.

2. A heating and ventilating system in an automotive vehicle having an instrument panel and a fire wall separating an engine compartment from a passenger compartment, said system comprising duct means with an air inlet extending substantially the full width of said fire wall, said duct means extending forwardly from said air inlet and having spaced downwardly extending portions, each of said portions having a valved outlet to said passenger compartment, a fan with its inlet connected to one of said portions, a heater connected to said fan and having an air outlet to said passenger compartment, valve means arranged to control air flow through said heater outlet, and means on said instrument panel for controlling each of said valved outlets and said valve means.

3. A heating, ventilating and defrosting system in an automotive vehicle having a cowl, a windshield, an instrument panel and a fire wall separating an engine compartment from a passenger compartment, said system comprising a heater, defroster nozzles, and duct means, said duct means extending into said engine compartment and having an air inlet in said cowl in advance of said windshield and an air outlet communicating with said passenger compartment, a first valve means arranged to control air flow through said outlet, fan means arranged to induce air flow from said duct means, means for conducting air from said fan means to said heater, a distribution chamber connected to the air outlet side of said heater, means for conducting air from said chamber to said defroster nozzles and to said passenger compartment, a second valve associated with said air conducting means for controlling air flow to said defroster nozzles, a third valve associated with said air conducting means for controlling air flow to said passenger compartment, dual interconnected switch controls mounted on said instrument panel and arranged to control said fan means, one of said dual controls being associated with a manual control for said second valve, and the other of said dual controls being associated with a manual control for said third valve.

4. A heating, ventilating and defrosting system for an automotive vehicle having a cowl, an instrument panel, a windshield and a fire wall separating an engine compartment from a passenger compartment, said system comprising first duct means with an inlet in said cowl near the base of said windshield, said first duct means and inlet communicating along substantially the full width of said fire wall, said first duct means having downwardly extending portions integral with said fire wall, each of said portions having an outlet communicating directly with said passenger compartment, a valve controlling each of said portion outlets, a heater having a distribution chamber, defroster nozzles directed against said windshield, a direct outlet leading from said chamber to said passenger compartment, a valve for controlling said direct outlet, second duct means leading from said chamber to said defroster nozzles, a defroster valve arranged to control air flow through said second duct means, a temperature control means for said heater, a fan arranged with its inlet in communication with one of said portions and its outlet connected to said heater, a first control assembly on said instrument panel connected to two elements comprising one of said valves controlling said portion outlets and said temperature control means, a second control assembly on said instrument panel connected to said defroster valve, and a third control assembly on said instrument panel connected to two elements comprising the other of said valves controlling the said portion outlets and said direct outlet valve.

5. A system as described in claim 4 having the first, second and third control assemblies mounted in spaced relation and the first and third control assemblies each being capable of selectively imparting a motion to either one of two of the said elements operatively connected thereto while returning the other to a normal position.

6. A system as described in claim 4 having a switch, dual controls for said switch, one of said switch controls being mounted adjacent to the said second control assembly and the other of said switch controls being mounted adjacent to the third control assembly, and said switch being arranged to control said fan.

7. A heating, ventilating and defrosting system for an automotive vehicle having a cowl, an instrument panel, a windshield and a fire wall separating an engine compartment from a passenger compartment, said system comprising first duct means for admitting outside air through the said cowl and extending forwardly through said fire wall and then to said passenger compartment, defroster nozzles arranged at an impingement angle with respect to said windshield, second duct means arranged to supply air to said nozzles, heated air supplying means including a fan and a heater connecting said first and second duct means, three spaced assemblies on said instrument panel, one of said assemblies being arranged to control air flow through the said second duct means, and the other two of said assemblies being arranged to control the temperature of air discharged by said heater and air flow through the said first duct means.

References Cited in the file of this patent

UNITED STATES PATENTS

| | | |
|---|---|---|
| 2,298,163 | Raney | Oct. 6, 1942 |
| 2,306,796 | Staley | Dec. 29, 1942 |
| 2,488,278 | Findley | Nov. 15, 1949 |
| 2,612,829 | Joyce | Oct. 7, 1952 |
| 2,627,218 | Katz | Feb. 3, 1953 |
| 2,634,670 | Simons | Apr. 14, 1953 |